(12) United States Patent
Maguire et al.

(10) Patent No.: US 10,179,708 B2
(45) Date of Patent: Jan. 15, 2019

(54) GRANULAR MATERIAL DELIVERY SYSTEM WITH AIR FLOW LIMITER

(71) Applicants: Stephen B. Maguire, West Chester, PA (US); Maguire Products, Inc., Aston, PA (US)

(72) Inventors: Stephen B. Maguire, West Chester, PA (US); James Zinski, Ellicot City, MD (US)

(*) Notice: Subject to any disclaimer, the term of this patent is extended or adjusted under 35 U.S.C. 154(b) by 0 days.

(21) Appl. No.: 15/392,650

(22) Filed: Dec. 28, 2016

(65) Prior Publication Data

US 2017/0107064 A1    Apr. 20, 2017

Related U.S. Application Data

(63) Continuation-in-part of application No. 14/574,561, filed on Dec. 18, 2014, now Pat. No. 9,604,793, which is a continuation-in-part of application No. 14/185,016, filed on Feb. 20, 2014, now Pat. No. 9,371,198, which is a continuation-in-part of application No. 14/602,784, filed on Jan. 22, 2015, now Pat. No. 9,550,636, and a continuation-in-part of application No. 14/593,010, filed on Jan. 9, 2015, now Pat. No. 9,550,635, and a continuation-in-part of application No. 14/804,404, filed on Jul. 21, 2015, and a continuation-in-part of application No. 62/027,379, filed on Jul. 22, 2014.

(51) Int. Cl.
| | |
|---|---|
| *B65G 53/24* | (2006.01) |
| *B65G 53/58* | (2006.01) |
| *B29C 31/00* | (2006.01) |
| *B65G 53/66* | (2006.01) |

(52) U.S. Cl.
CPC ............ *B65G 53/24* (2013.01); *B29C 31/002* (2013.01); *B65G 53/58* (2013.01); *B65G 53/66* (2013.01)

(58) Field of Classification Search
CPC ......... B65G 53/58; B65G 53/66; B65G 53/24
USPC ................................. 406/83, 192, 195, 197
See application file for complete search history.

(56) References Cited

U.S. PATENT DOCUMENTS

| | | |
|---|---|---|
| 1,001,510 A | 8/1911 | Curbey |
| 1,418,096 A | 5/1922 | Royer |
| 1,579,251 A | 4/1926 | Schossow |
| 2,116,912 A | 5/1938 | Richardson |

(Continued)

FOREIGN PATENT DOCUMENTS

| | | |
|---|---|---|
| CN | 202302166 U | 7/2012 |
| DE | 3541532 A1 | 5/1986 |

(Continued)

OTHER PUBLICATIONS

Sheet 2 photographs of Mould-Tek gravimetric blender, circa 1993.
(Continued)

*Primary Examiner* — Joseph A Dillon, Jr.
(74) *Attorney, Agent, or Firm* — Fox Rothschild LLP

(57) ABSTRACT

Apparatus and methods for conveying granular material from a supply to receivers that retain and dispense the material when needed by process machine include a vacuum pump, an air flow limiter connected to the vacuum pump, a first conduit connecting the receivers to the air flow limiter, and a second conduit connecting the material supply to the receivers.

2 Claims, 8 Drawing Sheets

(56) References Cited

U.S. PATENT DOCUMENTS

| | | | |
|---|---|---|---|
| 2,161,190 A | 6/1939 | Paull | |
| 2,351,035 A | 6/1944 | Grant, Jr. | |
| 2,403,689 A | 7/1946 | Sprague | |
| 2,601,654 A | 6/1952 | Wright | |
| 2,655,934 A | 10/1953 | Charles | |
| 2,718,435 A * | 9/1955 | Hudspeth | E21B 21/062 |
| | | | 406/131 |
| 2,765,812 A | 10/1956 | Werner | |
| 2,917,077 A | 12/1959 | Ziege | |
| 3,111,115 A | 11/1963 | Best | |
| 3,115,276 A | 12/1963 | Johanningmeier | |
| 3,122,162 A | 2/1964 | Sands | |
| 3,151,628 A | 10/1964 | Heckert | |
| 3,164,141 A | 1/1965 | Jones | |
| 3,209,898 A | 10/1965 | Beebe et al. | |
| 3,239,278 A * | 3/1966 | Mueller | B22D 1/005 |
| | | | 406/153 |
| 3,348,848 A | 10/1967 | Lucking et al. | |
| 3,367,362 A | 2/1968 | Hoffman | |
| 3,381,708 A | 5/1968 | Chenoweth | |
| 3,434,493 A | 3/1969 | Owens | |
| 3,468,338 A | 9/1969 | Patterson | |
| 3,470,994 A | 10/1969 | Schnell et al. | |
| 3,621,873 A | 11/1971 | Kenann | |
| 3,667,087 A | 6/1972 | Dakin | |
| 3,735,777 A | 5/1973 | Katzer et al. | |
| 3,773,300 A | 11/1973 | Hauser | |
| 3,794,077 A | 2/1974 | Fanshier | |
| 3,861,830 A * | 1/1975 | Johnson | B65G 53/28 |
| | | | 406/109 |
| 3,872,884 A | 3/1975 | Busdiecker | |
| 3,931,953 A | 1/1976 | Allen | |
| 3,951,461 A | 4/1976 | De Feudis | |
| 3,959,636 A | 5/1976 | Johnson et al. | |
| 3,985,262 A | 10/1976 | Nauta | |
| 4,005,908 A * | 2/1977 | Freeman | B65G 53/28 |
| | | | 406/109 |
| 4,026,442 A | 5/1977 | Orton | |
| 4,108,334 A | 8/1978 | Moller | |
| 4,148,100 A | 4/1979 | Moller | |
| 4,174,731 A | 11/1979 | Sturgis | |
| 4,183,467 A | 1/1980 | Sheraton | |
| 4,219,136 A | 8/1980 | Williams et al. | |
| 4,221,510 A * | 9/1980 | Smith | B65D 88/64 |
| | | | 406/118 |
| 4,262,878 A | 4/1981 | O'ffill | |
| 4,269,223 A | 5/1981 | Carter et al. | |
| 4,284,261 A | 8/1981 | Benjamin | |
| 4,294,020 A | 10/1981 | Evans | |
| 4,342,443 A | 8/1982 | Wakeman | |
| 4,354,622 A | 10/1982 | Wood | |
| 4,373,838 A | 2/1983 | Foreman | |
| 4,402,436 A | 9/1983 | Hellgren | |
| 4,402,635 A | 9/1983 | Maruo | |
| 4,454,943 A | 6/1984 | Moller | |
| 4,475,672 A | 10/1984 | Whitehead | |
| 4,498,783 A | 2/1985 | Rudolph | |
| 4,501,518 A | 2/1985 | Smith | |
| 4,508,091 A | 4/1985 | Wakeman | |
| 4,511,291 A | 4/1985 | Quates, Sr. et al. | |
| 4,525,071 A | 6/1985 | Horowitz et al. | |
| 4,581,704 A | 4/1986 | Mitsukawa | |
| 4,586,854 A * | 5/1986 | Newman | B05B 7/1404 |
| | | | 137/888 |
| 4,705,083 A | 11/1987 | Rossetti | |
| 4,756,348 A | 7/1988 | Moller | |
| 4,793,711 A | 12/1988 | Ohlson | |
| 4,812,086 A | 3/1989 | Kopernicky | |
| 4,830,508 A | 5/1989 | Higuchi et al. | |
| 4,834,385 A | 5/1989 | Jackson | |
| 4,842,198 A | 6/1989 | Chang | |
| 4,848,534 A | 7/1989 | Sandwall | |
| 4,850,703 A | 7/1989 | Hanaoka et al. | |
| 4,962,831 A | 10/1990 | Dundas | |
| 4,995,422 A | 2/1991 | Chew | |
| 5,011,043 A | 4/1991 | Whigham | |
| 5,054,965 A * | 10/1991 | Clark | B65G 53/24 |
| | | | 406/151 |
| 5,110,521 A | 5/1992 | Moller | |
| 5,116,547 A | 5/1992 | Tsukahara et al. | |
| 5,132,897 A | 7/1992 | Allenberg | |
| 5,143,166 A | 9/1992 | Hough | |
| 5,147,152 A | 9/1992 | Link | |
| 5,148,943 A | 9/1992 | Moller | |
| 5,172,489 A | 12/1992 | Moller | |
| 5,225,210 A | 7/1993 | Shimoda | |
| 5,232,314 A * | 8/1993 | Hopkins | B65G 53/523 |
| | | | 406/153 |
| 5,244,179 A | 9/1993 | Wilson | |
| 5,252,008 A | 10/1993 | May, III et al. | |
| 5,261,743 A | 11/1993 | Moller | |
| 5,285,930 A | 2/1994 | Nielsen | |
| 5,340,949 A | 8/1994 | Fujimura et al. | |
| 5,341,961 A | 8/1994 | Hausam | |
| 5,378,089 A | 1/1995 | Law | |
| 5,415,321 A | 5/1995 | Gehlert | |
| 5,423,455 A | 6/1995 | Ricciardi et al. | |
| 5,575,309 A | 11/1996 | Connell | |
| 5,575,596 A * | 11/1996 | Bauer | B65G 53/24 |
| | | | 406/132 |
| 5,613,516 A | 3/1997 | Landrum | |
| 5,651,401 A | 7/1997 | Cados | |
| 5,669,265 A | 9/1997 | Adler | |
| 5,704,391 A | 1/1998 | McGowan et al. | |
| 5,767,453 A | 6/1998 | Wakou et al. | |
| 5,767,455 A | 6/1998 | Mosher | |
| 5,780,779 A | 7/1998 | Kitamura et al. | |
| 5,791,830 A | 8/1998 | Fort | |
| 5,794,789 A | 8/1998 | Payson | |
| 5,843,513 A | 12/1998 | Wilke et al. | |
| 6,007,236 A | 12/1999 | Maguire | |
| 6,036,407 A * | 3/2000 | Nester | B65G 53/28 |
| | | | 406/109 |
| 6,076,803 A | 6/2000 | Johnson | |
| 6,085,777 A | 7/2000 | Welker | |
| 6,089,794 A | 7/2000 | Maguire | |
| 6,102,629 A | 8/2000 | Ishida | |
| 6,152,656 A | 11/2000 | Curtis et al. | |
| 6,158,363 A | 12/2000 | Memory et al. | |
| 6,199,583 B1 | 3/2001 | Iacovella | |
| 6,227,768 B1 | 5/2001 | Higuchi | |
| 6,379,086 B1 | 4/2002 | Goth | |
| 6,386,800 B1 | 5/2002 | van Eyck | |
| 6,413,020 B1 | 7/2002 | Davison | |
| 6,419,418 B1 | 7/2002 | Smith | |
| 6,447,215 B1 | 9/2002 | Wellmar | |
| 6,497,083 B1 | 12/2002 | Garwood | |
| 6,585,004 B1 | 7/2003 | Porter | |
| 6,588,988 B2 | 7/2003 | Zlotos | |
| 6,634,375 B2 | 10/2003 | Olivas | |
| 6,644,345 B2 | 11/2003 | Dulin | |
| 6,648,558 B1 | 11/2003 | Shultz | |
| 6,786,681 B2 | 9/2004 | Grasshoff | |
| 6,834,755 B2 | 12/2004 | Jay | |
| 6,871,618 B2 | 3/2005 | Masse | |
| 6,890,129 B2 * | 5/2005 | Fabbri | B01D 29/01 |
| | | | 406/106 |
| 6,923,601 B2 | 8/2005 | Goth | |
| 6,942,133 B2 | 9/2005 | Frankeberger | |
| 6,981,619 B2 | 1/2006 | Moretto | |
| 7,066,689 B2 | 6/2006 | Maguire | |
| 7,080,960 B2 | 7/2006 | Burnett | |
| 7,114,889 B2 | 10/2006 | Kanou | |
| 7,117,886 B2 | 10/2006 | Kajitani | |
| 7,137,729 B2 | 11/2006 | Moretto | |
| 7,188,434 B2 | 3/2007 | Moretto | |
| 7,191,807 B2 | 3/2007 | DeMaison | |
| 7,192,222 B2 | 3/2007 | Van Mullekom | |
| 7,231,927 B2 | 6/2007 | Suehara | |
| 7,311,474 B1 | 12/2007 | Ogasahara | |
| 7,318,459 B2 | 1/2008 | Frankeberger | |
| 7,384,018 B2 | 6/2008 | Moretto | |
| 7,472,494 B2 | 1/2009 | Moretto | |

(56) References Cited

U.S. PATENT DOCUMENTS

| | | |
|---|---|---|
| 7,503,128 B2 | 3/2009 | Moretto |
| 7,662,211 B2 | 2/2010 | Federico |
| 7,766,037 B2 | 8/2010 | Moenkhaus |
| 7,766,305 B2 | 8/2010 | Kim |
| 8,021,462 B2 | 9/2011 | Moretto |
| D650,888 S | 12/2011 | Moretto |
| 8,070,844 B2 | 12/2011 | Maguire |
| 8,092,070 B2 | 1/2012 | Maguire |
| 8,113,745 B2 | 2/2012 | Aoki |
| D671,563 S | 11/2012 | Moretto |
| D671,564 S | 11/2012 | Moretto |
| 8,322,951 B2 * | 12/2012 | Kvalheim .............. B65G 53/40 406/109 |
| 8,360,691 B2 | 1/2013 | Moretto |
| 8,412,383 B2 | 2/2013 | Moretto |
| 8,408,228 B1 | 4/2013 | Jimenez |
| D688,711 S | 8/2013 | Moretto |
| 8,672,194 B2 | 3/2014 | Moretto |
| 8,753,432 B2 | 6/2014 | Maguire |
| 8,763,273 B2 | 7/2014 | Moretto |
| 8,793,900 B2 | 8/2014 | Moretto |
| D718,791 S | 12/2014 | Moretto |
| 8,905,681 B2 | 12/2014 | Schneider |
| 8,914,990 B2 | 12/2014 | Moretto |
| 9,181,044 B1 | 11/2015 | Baker |
| 9,365,367 B2 | 6/2016 | Kraemer |
| 9,371,198 B2 | 6/2016 | Maguire |
| 9,459,183 B1 | 10/2016 | Schnakenberg |
| 9,550,635 B2 | 1/2017 | Maguire |
| 9,550,636 B2 | 1/2017 | Maguire |
| 9,604,793 B2 | 3/2017 | Maguire |
| 9,637,320 B2 | 5/2017 | Moretto |
| 9,663,263 B2 | 5/2017 | Moretto |
| 2002/0061232 A1 | 5/2002 | Zlotos |
| 2002/0136609 A1 | 9/2002 | Maguire |
| 2003/0168618 A1 | 9/2003 | Coney |
| 2004/0115013 A1 | 6/2004 | Goth |
| 2004/0221893 A1 | 11/2004 | Johnson |
| 2005/0012058 A1 | 1/2005 | Medina |
| 2005/0039816 A1 | 2/2005 | Maguire |
| 2005/0089378 A1 | 4/2005 | Gerber |
| 2005/0265793 A1 | 12/2005 | van Mullekom |
| 2008/0314461 A1 | 12/2008 | Moretto |
| 2009/0031580 A1 | 2/2009 | Moretto |
| 2009/0039106 A1 | 2/2009 | Moretto |
| 2009/0090018 A1 | 4/2009 | Moretto |
| 2009/0151800 A1 | 6/2009 | Salmento |
| 2009/0295016 A1 | 12/2009 | Shinohara |
| 2011/0211919 A1 | 9/2011 | Rasner |
| 2011/0299943 A1 | 12/2011 | Woolever |
| 2012/0201917 A1 | 8/2012 | Shinohara |
| 2013/0202370 A1 | 8/2013 | Moretto |
| 2013/0209180 A1 | 8/2013 | Moretto |
| 2015/0175282 A1 | 6/2015 | Thompson |
| 2015/0232287 A1 | 8/2015 | Maguire |
| 2015/0232289 A1 | 8/2015 | Maguire |
| 2015/0232290 A1 | 8/2015 | Maguire |
| 2015/0308584 A1 | 10/2015 | Ehrne |
| 2015/0321860 A1 | 11/2015 | Maguire |
| 2016/0096693 A1 | 4/2016 | Hanaoka |
| 2016/0158967 A1 | 6/2016 | Maguire |
| 2016/0167897 A1 * | 6/2016 | Wiemers ................ B65G 53/26 406/75 |
| 2016/0244275 A1 | 8/2016 | Maguire |
| 2016/0272439 A1 | 9/2016 | Kelly |
| 2016/0280473 A1 | 9/2016 | Veselov |
| 2016/0292953 A1 | 10/2016 | Brown |
| 2016/0347557 A1 | 12/2016 | Tell |
| 2017/0174447 A1 | 6/2017 | Baker |

FOREIGN PATENT DOCUMENTS

| | | |
|---|---|---|
| DE | 3923241 | 1/1991 |
| DE | 4323295 | 2/1995 |
| EP | 0318170 | 5/1989 |
| EP | 0507689 | 10/1992 |
| EP | 0587085 | 9/1994 |
| EP | 0743149 | 11/1996 |
| FR | 2109840 | 5/1972 |
| FR | 2235775 | 1/1975 |
| FR | 2517087 | 5/1983 |
| GB | 203758 A | 9/1923 |
| GB | 271930 A | 6/1927 |
| GB | 2081687 | 2/1982 |
| JP | 1235604 | 9/1989 |
| JP | 4201522 | 7/1992 |
| JP | 6114834 | 4/1994 |

OTHER PUBLICATIONS

Sheet of 2 photographs of Motan gravimetric blender and feeding system with Maguire Products, Inc. controls, circa 1993.
Sheet of 3 photographs of UNA-DYN gravimetric blender, circa 1993.
Sheet of 2 photographs of Maguire Products, Inc. gravimetric blender with Conair hoppers and feeding system, circa 1993.
Sheet of 1 photograph of Hydracolor gravimetric blender, circa 1993.
Advertisement entitled "Machinery and Systems for Extrusion is Our Only Business" by Process Control Corporation, circa 1993.
Advertisement entitled "Weigh Blender Delivers Unmatched Accuracy" by Universal Dynamics, Inc., circa 1993.
Advertisement entitled "A Full Line-up of Blender Solutions . . . Priced Right" by HydReclaim, circla 1993.
Advertisement entitled "New From HydReclaim—Now Processors Can Economically Achieve Continuous Gravimetric Blending" by HydReclaim, circa 1993.
Article entitled "Control Loading Systems" from Plastics Technology, Oct. 1995, p. 41.
Advertisement "Introducing our 400 VME-II Gravimetric Blender" by HydReclaim Corporation, circa 1993.
Four page brochure entitled "Gravimix Better Quality through Research", circa 1993.
Four page brochure entitled "Conomix Plus Volumetric Blender" dated Aug. 1993.
Four page brochure entitled "Conair Franklin Autocolor Y Mezclador" dated Mar. 1995.
Two-sided flyer entitled "GB 140 Series Compact Auto Weigh Blender" published by Conair Franklin in the United States, Jun. 1994.
Six page brochure entitled "Graviblend Precise Continuous Weigh Blenders" published by Ktron Vertech, Jun. 1991, United States.
Six page brochure entitled "Piovan Gravimetric Blenders MDW" published by Piovan Sri, Oct. 1993, Venezia, Italy.
One page two-sided flyer entitled "Gravimix, The New Gravimetric Blending Generation" published by Ferlin, De demsvaard, Holland, circa 1993.
Four page brochure entitled "When you Weigh it All Up . . . " published by Ferlin Trading, Holland, circa 1993.
Thirty-two page catalog entitled "Maguire Color Blending Equipment" published by Maguire Products, Inc., 1993, United States.
Two page brochure entitled "Mould-Tek Bulk Handling Systems" published by Mould-Tek Industries, Inc. in Canada, circa 1993.
Brochure entitled "Plastic Molders and Extruders: published by Maguire Products, Inc., 1995".
Five page brochure entitled "Blending power: GXB Blender The Better Alternative" of Mould-Tek, circa 1998.
Forty-four page two-sided brochure including cover and back pages entitled "Maguire: Auxiliary equipment for the plastics industry" of Maguire Products, Inc., Oct. 2000.
Two-sided color brochure entitled "Convey, Blend, Dry" published by Novatec, Inc., undated.
Three page two-sided color brochure entitled "Accuracy, flexibility and performance are at your fingertips with ConveyPacer III Series "S" Controller" of Mould-tek, 1999.

(56) References Cited

OTHER PUBLICATIONS

Seven page two-sided color brochure plus cover entitled "Exac-U-Batch Series Weigh Scale Blenders: Engineered to be the ultimate blend of precision and control!" of Mould-tek, 2000.

Three page two-sided color brochure entitled "We have the building blocks to integrate your entire plastics bulk handling system." of Mould-tek, 1999.

Two page two-sided color brochure entitled "Model GXB-2202 Exac-U-Batch Gravimetric Scale Blender: Accurate weigh scale blending under precise computer control" of Mould-tek, 2000.

One page, two-sided color brochure entitled "Bulk handling power: the manufacturer of the world's most advanced blender gives you the same performance in bulk handling systems" of Mould-Tek, dated Apr. 1999.

Three page two-sided color brochure entitled "Portable Drying and Conveying Systems: Nomad™ Series Portable Dryers", AEC Whitlock, 1998.

Two page two-sided color brochure entitled "Drying Systems: WD Series Dehumidifying Dryers" of AEC Whitlock, 1997.

19 page document entitled "Model MLS—Clear Vu Eight Component Vacuum Loading System: Operation Manual" of Maguire Products, Inc. dated May 4, 1999.

One page two-sided color brochure entitled "Maguire Clear-Vu™ Loading System" of Maguire Products, Inc.

Four page two-sided color brochure entitled "Novatec Inc. Vacuum Loaders—Electro-Polished Stainless Steel Finish" of Novatec Inc., undated.

Eight page two-sided color brochure entitled "Novatec Inc. Material Conveying Solutions for the Plastics Industry", 1999.

Two page two-sided color brochure entitled Maguire Model MPM Pre-Mixers of Maguire Products, Inc., Apr. 1997.

Two page two-sided color brochure entitled "WDMR Series Compact Dryers" of AEC Whitlock, 1998.

Two page two-sided color reprint entitled "10 most frequently asked questions about Dryers" by Joseph Dziediz, AEC/Whitlock, from Plastics Technology, Jan. 1998.

Two page two-sided color brochure entitled "Drying Systems: WD Series High Capacity Dehumidifying Dryers" of AEC Whitlock, 1997.

Five page two-sided color brochure entitled "AEC Auxiliaries As Primary", AEC, Inc., 1999.

\* cited by examiner

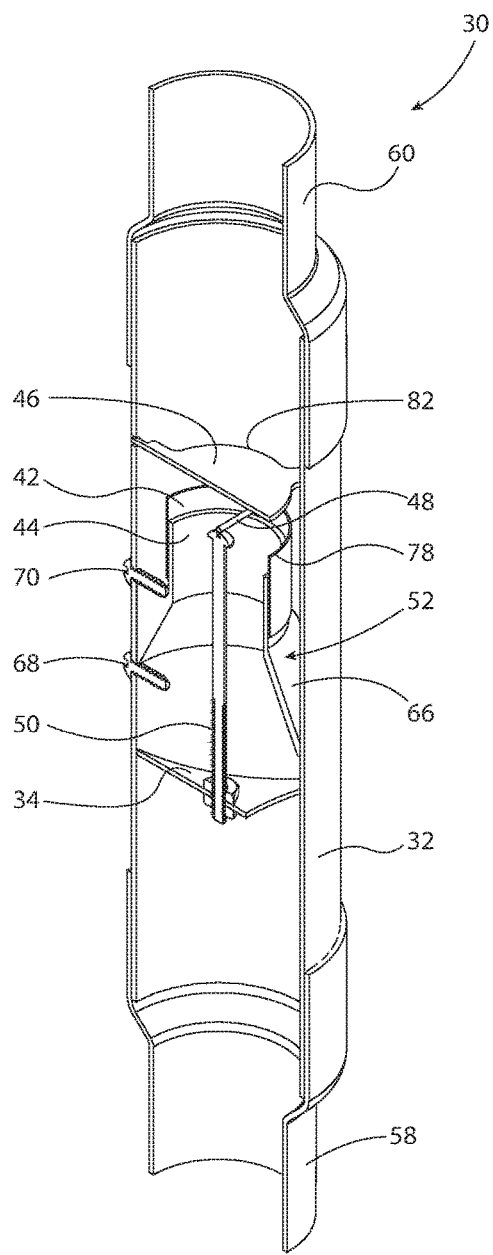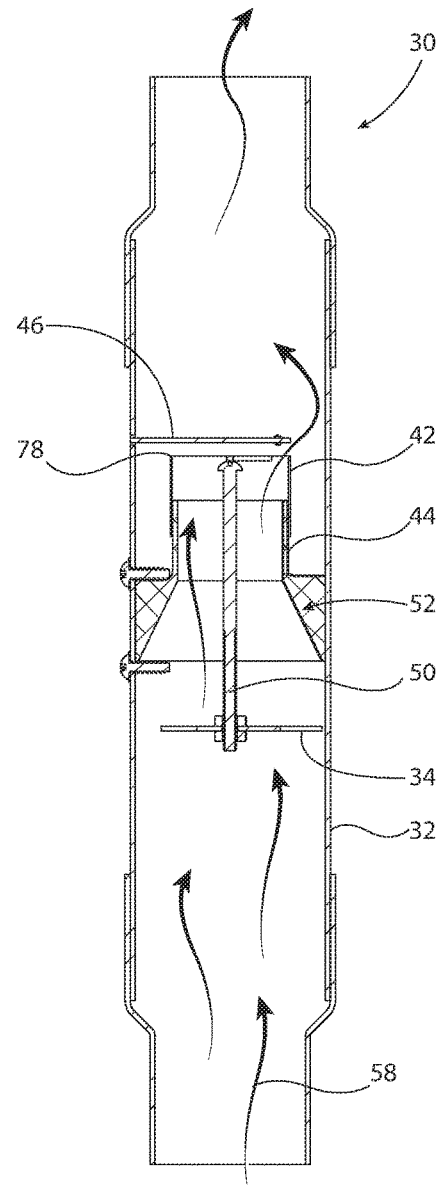
FIG. 5                    FIG. 6

GRANULAR MATERIAL DELIVERY SYSTEM WITH AIR FLOW LIMITER

CROSS-REFERENCE TO RELATED PATENT APPLICATIONS

This patent application is a 35 USC 120 continuation-in-part of U.S. Ser. No. 14/574,561 entitled "Resin Delivery System with Air Flow Regulator" filed 18 Dec. 2014 in the name of Stephen B. Maguire and published 20 Aug. 2015 as US 2016-0238016 A1, the priority of which is claimed under 35 USC 120, which in turn is a continuation in part of U.S. Pat. No. 9,371,198 issued 21 Jun. 2016 in the name of Stephen B. Maguire and entitled "Air Flow Regulator", the priority of which is also claimed under 35 USC 120.

This patent application is also a 35 USC 120 continuation-in-part of U.S. Ser. No. 14/602,784 entitled "Method and Apparatus for Resin Delivery with Adjustable Air Flow Limiter" filed 22 Jan. 2015 in the name of Stephen B. Maguire, published 20 Aug. 2015 as US 2015-0232290 A1, now allowed, the priority of which is claimed under 35 USC 120, which in turn is also a continuation-in-part of U.S. Pat. No. 9,371,198.

This patent application is yet also a 35 USC 120 continuation-in-part of U.S. Ser. No. 14/804,404 entitled "Vacuum Powered Resin Loading System Without Central Control" filed 21 Jul. 2015 in the name of Stephen B. Maguire, published 12 Nov. 2015 as US 2015-0321860 A1 The '404 application also claimed the benefit of U.S. Ser. No. 62/027,379 filed 22 Jul. 2014 and further was a 35 USC 120 continuation-in-part of both U.S. Ser. No. 14/185,016 (now the '198 patent) and Ser. No. 14/574,561, the priority of both of which is claimed under 35 USC 120.

This patent application also claims the benefit of the priority of U.S. provisional application Ser. No. 62/027,379 entitled "Central Vacuum Loading System Without Central Control", filed 22 Jul. 2014 in the name of Stephen B. Maguire. U.S. patent application Ser. No. 14/602,784 claimed priority to the '379 application. The priority of the '379 application is therefore claimed under 35 USC 119 and 35 USC 120 through the '784 application.

This patent application is further a 35 USC 120 continuation-in-part of U.S. Ser. No. 14/593,010 entitled "Air Flow Limiter with Closed/Open Sensing" filed 9 Jan. 2015 in the name of Stephen B. Maguire, published 20 Aug. 2015 as US 2015-0232289 A1, now allowed, the priority of which is claimed under 35 USC 120.

INCORPORATION BY REFERENCE

The disclosures of the '516, '784, '404 and '010 applications and the '198 patent are hereby incorporated by reference.

STATEMENT REGARDING FEDERALLY SPONSORED RESEARCH AND DEVELOPMENT

Not Applicable.

BACKGROUND OF THE INVENTION

Field of Invention

This invention relates principally to manufacture of plastic articles and even more particularly relates to pneumatic conveyance and processing of plastic resin pellets, as well as other granular materials, prior to molding, extrusion, or other processing of those pellets or other granular materials into a finished or semi-finished product.

In this patent application, injection and compression molding presses and extruders are collectively referred to as "process machines."

Description of the Prior Art

Current resin and other granular material central loading systems concerned with conveying granular material from a storage area for molding or extrusion typically include a vacuum pump or pumps and multiple receivers.

In some systems, with many receivers, several small pumps are used.

It would be less expensive to use only one, or fewer, larger pumps. However, a larger pump may draw too much air with resulting damage to the material being conveyed. While a larger pump could load several receivers at once, there is a risk that an "open" line, namely a line drawing only air, and no material, would cause the vacuum to drop too much, and no material would load. Also, when only one receiver is loading material, air velocity might be too high, again with a risk of damaging the material.

Nevertheless, in facilities that fabricate products by molding or extrusion, it is common to use such vacuum loading systems to pneumatically convey pellets of thermoplastic resin or other materials, prior to molding, extrusion, or other processing of those pellets or other materials into a finished or semi-finished product. The materials are typically purchased in 50 pound bags, 200 pound drums, or 1,000 pound containers commonly referred to as "Gaylords."

A preferred approach for conveying plastic resin pellets and other granular materials from a storage location to a process machine, which approach is often used in larger facilities, is to install a central vacuum pump or even several vacuum pumps, connected by common vacuum lines to multiple "receivers."

Vacuum pumps connected to the vacuum lines draw vacuum, namely air at pressure slightly below atmospheric, as the vacuum pump sucks air through the "vacuum" line. The suction moves large quantities of air which carries thermoplastic resin pellets or other granular material through the "vacuum" line.

An alternative is to use positive pressure produced by either a blower or the exhaust side of a vacuum pump. With such an approach, the positive pressure results in movement of substantial amounts of air which may be used to carry the granular material. However, the vacuum approach of drawing or sucking granular material through the system conduits is preferable to the positive pressure approach of pushing the material granules through the system conduits.

In practice, vacuum pumps are preferred and vacuum lines are desirable in part because power requirements to create the required vacuum necessary to draw granular materials through the lines are lower than the power requirements if the material granules are pushed through the lines by a blower or by the exhaust side of a vacuum pump. When vacuum is used, the static pressure within the line may be not much less than atmospheric. When positive pressure is used, the dynamic pressure of the air flowing through the line must be relatively high in order to move an adequate quantity of granular material.

As used herein, and in light of the foregoing explanation, the terms "vacuum pump" and "blower" are used interchangeably.

When one or more central vacuum pumps are connected to multiple receivers, a receiver is typically located over each temporary storage hopper, in which the plastic resin pellets or other granular material is temporarily stored before being molded, extruded, or otherwise processed. A temporary storage hopper is typically associated with each process machine.

In current practice, the receiver is connected by a control wire to a central control system. The control system works by selectively opening a vacuum valve located in each receiver, allowing one or several vacuum pumps to work in sequence drawing "vacuum", i.e. below atmospheric pressure air, to carry the pellets or other material granules among and to multiple receivers as individual ones of the receivers, positioned over individual hoppers associated with the individual process machines, require additional plastic resin pellets or granules of other material. The receiver for a given hopper-process machine combination is actuated by opening the vacuum valve located in or near the receiver, causing the receiver to supply plastic resin pellets or granules of other material by gravity feed into the hopper from where the pellets or other material granules may be fed further downwardly by gravity into the associated process machine.

Large, high capacity industrial vacuum pumps are reliable and are suited to heavy duty industrial use. Large high capacity vacuum pumps allow long conveying distances for the plastic resin pellets and other granular materials. Currently available large capacity vacuum pumps permit plastic resin pellets and other granular materials that are similar in size and density to be conveyed over distances of 200 feet or more using vacuum drawn by the pump. Use of such high capacity vacuum pumps results in a rush of below atmospheric pressure air through the line, carrying the plastic resin pellets or other granular materials over a long distance.

Operators of manufacturing facilities prefer to buy plastic resin pellets and other necessary granular materials in bulk, in rail cars or tanker trucks. Bulk purchases result in cost savings. Such materials delivered in bulk are typically pumped into large silos for storage. In a large manufacturing facility, the distance from a plastic resin pellet or other material storage silo to a process machine may be several hundred feet, or more. Accordingly, when plastic resin pellets or other granular materials are purchased in bulk, a central vacuum-powered conveying system, powered by one or more large, high capacity industrial vacuum pumps, is a necessity.

Typically, large central plastic resin pellet and other similar granular material conveying systems have one or more vacuum pumps, each typically from 5 to 20 horsepower. These central systems include central controls connected by wire to each receiver associated with each process machine in the facility. Typically eight, sixteen, thirty-two or sixty-four receivers, each associated with a process machine, may be connected to and served by the central vacuum conveying system. Of course, the higher the number of receivers served by the system, the higher the cost.

A factor to be considered in designing such a system is the speed of the plastic resin pellets or other material granules as they flow through a conduit as the pellets or granules are carried by the moving air stream drawn by the vacuum pump. If air flow is too slow, the pellets or other granules fall out of the air stream and rest on the bottom of the conduit, with resulting risk of clogging the conduit. If air flow is too fast, the pellets or other granules can skid along the conduit surface. In such case, harder, more brittle plastic resin pellets and other granular materials may be damaged, resulting in dust within the conduit, which when drawn into the vacuum pump can damage the vacuum pump and render the system inoperative. Softer plastic resin pellets and other soft granular materials heat up and can melt from friction when contacting the conduit interior surface. In the case of plastic resin pellets, this results in "angel hair"—long, wispy-thin strands of plastic film which eventually clog the conduit and cause the system to shut down.

For these reasons, pneumatic plastic resin pellets and other granular material conveying systems must be designed to produce desired, reasonable conveying speeds for the conveyed materials.

Currently, conveying speed of the plastic resin pellets and other granular material is most often controlled by controlling air flow, measured in cubic feet per minute, and varying the desired and designed cubic feet per minute based on conduit diameter, with a larger diameter conduit requiring more cubic feet per minute of air flow to maintain proper air flow speed through the conduit. Controlling air flow, measured in cubic feet per minute, is conventionally done by properly specifying the vacuum pump by capacity and, in some cases, by varying speed of the vacuum pump as the vacuum pump draws the air in a "vacuum" condition through the conduit, carrying plastic resin pellets or other material granules in the moving, below atmospheric pressure air. Controlling cubic feet per minute of air flow is an indirect way of controlling plastic resin pellet or other material granule speed as the pellets or other granules flow through a conduit of a given diameter.

Typically, a 2 inch diameter conduit requires about 60 cubic feet per minute of air flow to convey typical plastic resin pellets or other granular material of similar size and density characteristics. A 2½ inch diameter conduit typically requires about 100 cubic feet per minute of air flow to convey typical plastic resin pellets or other granular material. To achieve these desired air volume flow rates, a conventional designer must carefully match the horsepower of a vacuum pump, which has a given cubic feet of air per minute rating, to a selected size conduit, taking into consideration the average distance the plastic resin pellets or other material granules must be conveyed through the conduit from a storage silo to a receiver or loader. If this results in selection of a 5 horsepower blower/vacuum pump, then a given facility may require several such blowers/vacuum pumps, with each blower/vacuum pump supplying only a selected number of receivers.

A single plastic resin molding or extruding facility or another type of granular material processing facility might theoretically require a 20 horsepower blower and the corresponding cubic feet per minute capability for conveyance provided by the single blower to meet the total conveying requirements for plastic resin pellets or other material granules throughout the facility. However, a single twenty horsepower blower would result in far too high a conveying speed for the plastic resin pellets or other material granules through any reasonable size conduit. As a result, the conveying system for the plastic resin pellets or other granular material in a large facility is necessarily divided and powered by three or four smaller blowers, resulting in three or four different, separate systems for conveyance of plastic resin pellets or other granular material. Sometimes several blowers are connected to a single set of receivers, with one or more of the extra blowers turning "on" only when required to furnish the required extra cubic feet per minute of air flow. This is controlled by a central station monitoring all receivers and all blowers, with the central station being programmed to maintain all of the hoppers associated with the process machines in a full condition, wherever those hoppers are located throughout the facility.

Even with careful planning and design, results achieved by such pneumatic plastic resin pellet or other granular material conveying systems are not consistent. Air flow speed and cubic feet per minute capacity of blowers often vary and are outside of selected design and specification values.

SUMMARY OF THE INVENTION

The instant invention provides an improvement to known pneumatic plastic resin pellet and other granular material conveying systems, reducing the costs of those systems while providing consistent control of delivered cubic feet per minute of air for individual receivers. The invention also facilitates easy expansion of the pneumatic plastic resin pellet and other granular material conveying system as the system grows. Such expandable systems are made feasible by an air flow controller embodying aspects of this invention.

In one aspect of this invention, air flow control limiters, desirably of the type generally disclosed in U.S. Pat. No. 9,371,198, are added to each receiver so that the air pulled from any single receiver is limited to the correct predetermined, preselected flow rate. This prevents excessive flow rates and "open" lines that dump too much air into the system.

Use of these air flow limiters allow one large pump to be used without risk to the system or to the resin or other granules being conveyed. An added advantage of a very large pump is that it can fill multiple receivers simultaneously with resin or other granular material. As used herein, the term "receiver" denotes the type of apparatus disclosed in U.S. Pat. Nos. 6,089,794; 7,066,689, and 8,753,432. The disclosures of these patents are hereby incorporated by reference.

The invention allows receivers to "load" the resin or other granular material the instant there is demand for material by dropping or otherwise supplying the material, usually downwardly, into a gravimetric blender or directly into a process machine. The receiver need not wait in the "queue" to load because no sequencing of the receivers is required. Each receiver is always "ready to go."

A central control station is not required, and neither is wiring from each receiver to a central control station, thus further reducing costs.

Consequently, in this invention as implemented in one of its embodiments, there are one or several large vacuum pumps, with receivers that stand alone without need for a central control, and an air flow limiter on each receiver to assure proper and constant flow rate.

This invention facilitates periodically reducing the speed of the vacuum pump, to hold the desired vacuum level in the lines. This is in contrast to running the vacuum pump at full speed all the time.

"CFM" is a term referring to a cubic foot of air regardless of the density of the air. "SCFM" refers to a cubic foot of air at standard temperature and pressure, namely 70° F. at sea level. The air flow limiter holds SCFM constant. This means that air flow through the air flow limiter will be faster when the air is thin, such as at high altitudes, and slower when the air is thick, such as at sea-level. However, in both cases (or any case), the air flow limiter maintains SCFM, namely air flow in standard cubic feet per minute, constant. Stated differently, so long as the SCFM is held steady, as is the case with the air flow limiter disclosed herein, the same weight of air, or number of air molecules, flows through the limiter regardless of conditions. Air flow rate through the limiter may change in terms of the speed of the air, but in all cases, the quantity of air flowing, measured in standard cubic feet per minute, is constant.

In another embodiment of the invention one air flow limiter, as disclosed in the instant application, is in place as a single air flow limiter at the vacuum pump suction inlet with the vacuum pump being connected to a plurality of receivers all connected in a system. This provides a selected, correct rate of air flow in standard cubic feet per minute. In this embodiment of the invention, only a single air flow limiter is used at the vacuum pump inlet, as opposed to the alternative embodiment of the invention described above where one air flow limiter is used at each receiver.

An advantage of using only a single air flow limiter of the type disclosed herein is that the vacuum pump can be sized and operated for the longest distance over which resin or other granular material is to be conveyed in a given locale. This can be done while still protecting shorter runs of the system from excessive granular material velocity, where less vacuum is required. One air flow limiter costs less than having an air flow limiter located at every receiver; this provides an advantageous aspect to this embodiment of the invention.

By adding an air flow limiter manifesting aspects of this invention to every receiver, control of air flow in cubic feet per minute can be maintained at a constant value that is ideal for that particular receiver, considering conduit diameter and distance over which the plastic resin pellets or other granular material must be conveyed through the associated conduit. Alternatively, by adding an air flow limiter just to the suction inlet of the vacuum pump, one can control air flow in cubic feet per minute to a constant value that is ideal for the system as a whole, considering conduit diameter and distance over which the plastic resin pellets or other granular material must be conveyed to the multiple receivers in the system.

Use of the air flow limiter allows pneumatic plastic resin pellet or other granular material conveying systems to utilize a single large high horsepower vacuum pump. In accordance with one embodiment of the invention, each receiver in a facility is fitted with an air flow limiter embodying the invention so the flow for each receiver in cubic feet per minute is self-limiting. This approach eliminates the need to match vacuum pumps or blowers to a specific material conduit size or conveyance distance. Using this approach, the flow limiter permits operators to run a very large vacuum pump or blower at a speed that will maintain a desired high level of vacuum throughout the entire vacuum (or pneumatic) plastic resin pellet or other granular material conveying system.

Using larger than standard diameter vacuum conduits allows a significant vacuum reserve to exist in the plastic resin pellet or other granular material conveying system, without the need for a vacuum reserve tank. Larger diameter conduits also mean there is little loss of vacuum over long distances, even at the most distant receiver to which plastic resin pellets or other material granules are supplied by the system. A variable frequency drive control may be used to adjust the speed of the vacuum pump to maintain air flow at the desired standard cubic feet per minute rate through the air flow limiter.

With the flow regulator facilitating use of high horsepower vacuum pumps or blowers, designers can now design to load multiple receivers at the same time without fear of dropping vacuum levels too low in portions of the pneumatic or vacuum plastic resin pellet or other granular material conveying system.

In the plastic resin pellet or other granular material conveying system aspect of the invention, no central control system is required. Using the flow limiter of the invention, each receiver controls its own operation and is not wired to any central control facility. When the level of plastic resin pellets or other material granules in the hopper of a process machine falls to a sufficiently low level, a level sensor tells the receiver to load the hopper of the process machine. Coupled to the level sensor may be a vacuum sensor, which confirms that the main system has sufficient vacuum available to load the receiver. If too many other receivers are currently loading, and the vacuum level is sensed to be below the threshold for effective loading, then the receiver associated with the sensor will wait until vacuum readings rise. When available system vacuum is sufficient to assure adequate flow of plastic resin pellets or other material granules into a given receiver, the vacuum sensor causes a vacuum valve associated with the receiver to open the connection of the receiver to the conduit carrying the plastic resin pellets or other granular material, and the receiver fills with resin pellets.

In accordance with one aspect of the invention, each receiver acts on its own sensed information. Use of the high horsepower vacuum pump means that several receivers can load simultaneously.

The air flow limiter does several things to make such systems in accordance with the invention possible. By limiting cubic feet per minute of flow to the desired constant level, there is virtually no limit on the horsepower of the vacuum pump. The risk of a too high a conveyance speed of the plastic resin pellets or other material granules through the conduit is eliminated. Additionally, if a receiver is not drawing in plastic resin pellets or other granular material but is just drawing air as a result of the main supply of plastic resin pellets or other material granules being exhausted, the empty conduit of the conveying system would ordinarily convey a substantial amount of air, which normally would drop the vacuum reserve of the entire pneumatic conveying system very rapidly. But with the flow limiter such dumping of air into the conveying conduit is at least substantially reduced, and if the flow limiter is at the suction intake of the vacuum pump, such dumping of air into the system is essentially impossible.

Further contributing to minimized air dump into the vacuum conduit is the receiver's ability to detect system failure or absence of material being loaded, thereby stopping further load cycles and sounding an alarm.

The air flow limiter preferably has but a single moving part, a valve, which relies on two opposing forces, namely gravity in one direction and "lift" created by air flow in the opposite direction. Because the air flow limiter uses gravity to close the valve portion of the regulator, orientation of the air flow limiter is important. Air flow must be upward, essentially or at least largely vertically through the air flow limiter, to counter the downward force of gravity.

The air flow limiter is desirably in the form of a tube with an air flow actuated valve within the tube. In a "no flow" condition, gravity holds the valve closed. However, as air flow through the limiter reaches a pre-selected design value, air flowing over and against a sail-like plate lifts an internal free floating valve. This shuts off air flow through the air flow limiter if the free floating valve rises sufficiently to contact a stop located within the tube.

By adjusting the size and/or shape of the "sail", and the weight of the free floating valve, desired air flow in standard feet per minute can be regulated very closely. Gravity as a force in one direction means the opening force is constant over the full range of motion of the valve device. (A spring, if one were used, would provide a variable force. However, use of gravity in the air flow limiter eliminates that variable).

In the air flow limiter, at the desired design standard cubic feet per minute of air flow, the valve opens as air lifts it. The valve would continue moving upwardly except for the fact that the valve reaches a point of air flow restriction where the valve holds air flow steady at the desired design value. If the valve moves further upwardly towards a "closed" position, this reduces air flow and the resulting force on the valve, causing the valve to drop in response to gravity. If the valve drops below the control level, this allows more air flow and consequently the valve rises as the air pushes the valve upwardly. As a result, the valve reaches the desired design valve equilibrium control point essentially instantly and very accurately. Usually the length of the short tube is less than the diameter of the short tube. Desirably the length of travel of the short tube is no more than one half the length of the short tube.

Known air flow shutoffs are subject to "vacuum pull", causing them to shut off completely once air begins to flow. This is because in known shutoffs, vacuum "pull" of the vacuum pump is always present. In the air flow limiter preferably used herein, a short vertical tube closes against a flat horizontal surface. In this air flow limiter, air flow is preferably directed through the center of the short tube and preferably escapes over the top edge of the short tube and preferably then around open edges of a flat shutoff surface. A flat, desirably triangular or star-shaped plate is preferably positioned in the air flow below and preferably connected to the short tube. This plate acts as a sail in the air flow and will, at the designed desired standard cubic feet per minute air flow rate, provide enough lift to raise the short tube against the shutoff plate.

At shut off, with vacuum above the flat shutoff surface and air at some pressure below the flat shutoff surface, most of the air pressure forces are against the walls of the short tube. Those forces are radially outwardly directed. Specifically, they are horizontal due to the configuration of the air flow limiter, and do not exert significant vertical force that would make the movable portion of the valve, namely the short tube, move in a vertical direction.

The surface of the end of the short tube, at the short tube end edge, is a horizontal surface and can provide a small vertical force when air travelling upwards impinges on the surface. For this reason, the air flow limiter aspect of the invention uses a very thin wall short tube, to minimize the vertically projected, horizontal surface area of the short tube.

In the air flow limiter preferably used herein, air flow rate in cubic feet per minute can be adjusted by adding or subtracting weight from the floating valve, or by adjusting the surface area of the sail, or by adjusting the size or shape of the sail in the air flow.

Accordingly, in one of its aspects, the invention provides a resin delivery system and method that includes an air flow limiter preferably having a vertically oriented tube, a pair of open-ended telescoping tubular internal segments within the tube, with an outer tubular segment preferably being fixed and the other preferably being slidably moveable along the fixed segment in the axial direction. The air flow limiter preferably further includes a plate extending partially across the interior of the vertically oriented tube and positioned for contacting the moveable one of the desirably telescoping tubular segments and limiting travel of the moveable telescoping tubular segment, with the plate covering the upper, open end of the moveable desirably telescoping tubular segment upon contact therewith. In this aspect, the invention yet further preferably includes a sail positioned in the vertically oriented tube below the telescoping segments, a strut connecting the sail and the moveable telescoping tubular segment, and a baffle positioned to direct upward air flow within the tube through the desirably telescoping tubular segments. The moveable desirably telescoping tubular segment moves vertically within the tube, unitarily with the sail, responsively to air flowing upwardly through the tube against the sail.

The tubular segments are preferably cylindrical; the surface of the plate contacted by the moveable tubular segment is preferably planar; and the portion of the moveable tubular segment contacting the plate surface is preferably annular.

In a variation of terminology, a surface of the plate contacted by the moveable tubular segment is flat, the tubular segments are cylindrical and the circular edge of the tubular segment contacting the plate surface is annular and normal to the axis of the tubular segment.

In yet another one of its aspects, this invention provides a granular material delivery system having at least one air flow limiter consisting of a vertically oriented tube, a tubular segment within the tube, which segment is moveable in the axial direction, a plate extending at least partially across the interior of the tube for contacting the movable tubular segment and defining a limit of travel of the moveable tubular segment, a sail positioned in the tube below the moveable tubular segment and being moveable vertically within the tube, a strut connecting the tubular segment and the sail, and a baffle connected to and located within the tube defining a lower limit of travel of the moveable tubular segment upon contact of the strut with an upper extremity of the baffle. The moveable tubular segment is in sliding, desirably telescoping engagement with the tubular portion of the baffle, directing upward air flow within the tube, with the moveable tubular segment being moveable unitarily with the sail in response to upward air flow through the tube contacting the sail.

In yet another one of its aspects, this invention provides a granular material delivery system that includes at least one air flow regulator having a vertically oriented tube with a sail assembly positioned in the tube and moveable therewithin responsively to air flow through the tube to regulate air flow through the tube and to stop air flow thorough the tube upon air flow exceeding a preselected value expressed in standard cubic feet per minute.

In yet another one of its aspects, this invention provides a method for conveying granular plastic resin or other granular material by controlled air flow where air flow control involves the steps of providing a vertically oriented tube, positioning a moveable sail assembly including a sail within the tube, positioning a stop within the tube, and permitting the sail assembly to move responsively to air flow through the tube between a position at which air flows around the sail assembly and through the tube, and a position at which the sail assembly contacts the stop and blocks air flow through the tube.

In yet another one of its aspects, this invention provides a pneumatic granular material delivery system utilizing air flow regulating apparatus including a preferably substantially vertically oriented first tube, a preferably substantially vertically oriented second tube which is moveable along and within the first tube, a baffle within the first tube for forcing air flow in the first tube through the second tube, a guide within the first tube for limiting the second tube to preferably substantially vertical co-axial movement within and relative to the first tube, a sail within the first tube being connected to the second tube and being moveable responsively to air flow within the first tube, and a stop within and connected to the first tube for limiting upward travel of the second tube.

In still another one of its aspects, this invention provides apparatus for conveying granular plastic resin or other granular material from a supply preferably to receivers that retain and dispense the resin or other material granules when needed by a process machine, where the apparatus preferably includes a vacuum pump, a single air flow limiter preferably connected to a suction head of the vacuum pump, a first conduit preferably connecting the receivers to the air flow limiter, and a second conduit preferably connecting the granular material supply to the receivers. In this embodiment of apparatus of the invention, suction created by operation of the vacuum pump preferably draws granular plastic resin or other material granules from the supply into the receivers through the second conduit and preferably draws air from the second conduit through the receivers, the first conduit and the air flow limiter. The air flow limiter is preferably oriented substantially in a vertical direction for substantially vertical flow of air substantially upwardly therethrough.

In yet still another aspect, this invention provides apparatus for conveying granular plastic resin material or other granular material from a supply of granular material to receivers that retain and dispense the resin or other granular material when needed by a process machine, where the apparatus preferably includes a vacuum pump, air flow limiters connected to outlets of the receivers, with the air flow limiters preferably being vertically oriented for vertical flow of air drawn by suction therethrough, a first conduit connecting the air flow limiters to a suction head of the vacuum pump and a second conduit connecting the granular material or supply to the receivers. In this apparatus aspect of the invention, suction created by operation of the vacuum pump preferably draws granular plastic resin or other material granules from the supply of granular material into the receivers through the second conduit, and also preferably draws air from the second conduit through the receivers, the air limiters, and the first conduit. In this second embodiment, at least one of the air flow limiters preferably consists of a tube, a tubular segment within the tube that is moveable in the axial vertical direction, a plate extending at least partially across the interior of the tube for contacting the moveable tubular segment and defining a limit of vertical travel of the moveable tubular segment, a sail connected to the moveable tubular segment and being moveable therewith within the tube, and a baffle connected to and within the tube defining a second limit of vertical travel of the moveable tubular segment, where the moveable tubular segment is in sliding, telescoping engagement with the tubular portion of the baffle and the baffle directs air flow within the tube into the tubular segment. The moveable tubular segment moves unitarily with the sail in response to vertical air flow through the tube contacting the sail.

While the foregoing summarizes the invention and the manner of practicing it in a manner that one of skill in the art can practice the invention, it is to be understood that the foregoing summary of the invention is only a summary and that the invention has aspects broader than those recited. The invention may be implemented in embodiments other than those disclosed herein and may be practiced using apparatus other than that disclosed herein. It is further to be understood that the drawings are attached for purposes of explanation only and that one of skill in the art, upon reading the foregoing description and summary of the invention and looking at the drawings, might contemplate alternate means of practice of the invention. All of such alternate means are deemed to be within the scope of the invention so long as those alternate means achieve essentially the same result in essentially the same way as the invention and are functionally related to the function of this invention.

BRIEF DESCRIPTION OF THE DRAWINGS

FIG. 5 is an isometric sectional view of the air flow limiter illustrated in FIGS. 3 and 4, with the section taken at arrows 3-3 in FIG. 4.

FIG. 6 is a sectional view in elevation of the air flow limiter illustrated in FIGS. 3 and 5, with the section taken at lines and arrows 3-3 in FIG. 4, with air flow through the air flow limiter being depicted in FIG. 6 by curved dark arrows.

DETAILED DESCRIPTION OF THE OF THE INVENTION

In this application, unless otherwise apparent from the context it is to be understood that the use of the term "vacuum" means "air at slightly below atmospheric pressure." The vacuum (meaning air slightly below atmospheric pressure) provides a suction effect that is used to draw granular plastic resin or other granular material out of a supply and to convey that resin or other granular material through various conduits to receivers where the resin or other granular material can be temporarily stored before being molded, extruded, or otherwise processed. Hence, in this application it is useful for the reader mentally to equate the term "vacuum" with the term "suction".

Figure 1:
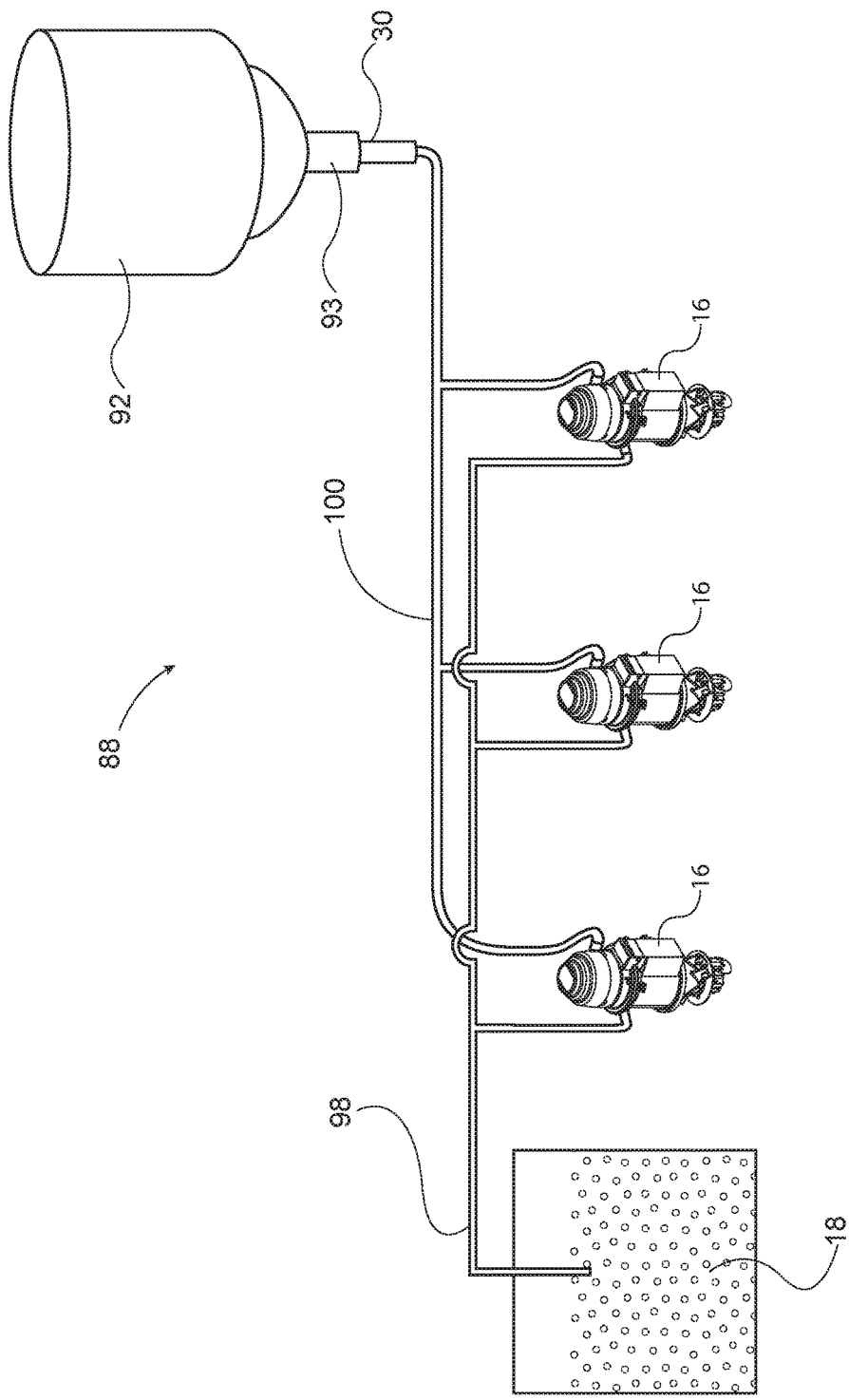
FIG. 1 is a schematic representation of a resin or other granular material delivery system with a single air flow regulator in accordance with aspects of the invention.

Referring to the drawings in general and to FIG. 1 in particular, apparatus for conveying granular plastic resin material or other granular material from the supply to receivers that retain and dispense the resin or other material granules when needed by a process machine is illustrated in FIG. 1. The apparatus, which is designated generally 88 in FIG. 1, preferably includes a vacuum pump designated generally 92 and shown schematically in FIG. 1. The vacuum pump preferably includes a vacuum pump suction head 93 also shown schematically in FIG. 1. Connected to the vacuum pump suction head 93 is an airflow limiter 30 shown only in schematic form in FIG. 1, but shown in detail in FIGS. 3 through 12. Airflow limiter 30 receives vacuum drawn by vacuum pump 92 through vacuum drawing conduit 100.

Vacuum drawing conduit 100 is connected to a plurality of receivers 16, each of which receives, retains and dispenses, as needed, granular plastic resin material or other granular material to a process machine, such as a granulator, a blender, an extruder, or a molding press, as located preferably below a receiver 16. The process machines are not illustrated in FIG. 1 to enhance the clarity of the drawing.

Further illustrated in FIG. 1 is a hopper 18 for storage of granular plastic resin material or other granular materials therein and a resin conveying conduit 98, which serves to draw resin from hopper 18 and to deliver the granular material through resin conveying conduit 98 to the respective receivers as vacuum is drawn by the vacuum pump, with vacuum propagating through air flow limiter 30, vacuum drawing conduit 100, the various receivers 16, and resin conveying conduit 98, back to hopper 18.

Figure 2:
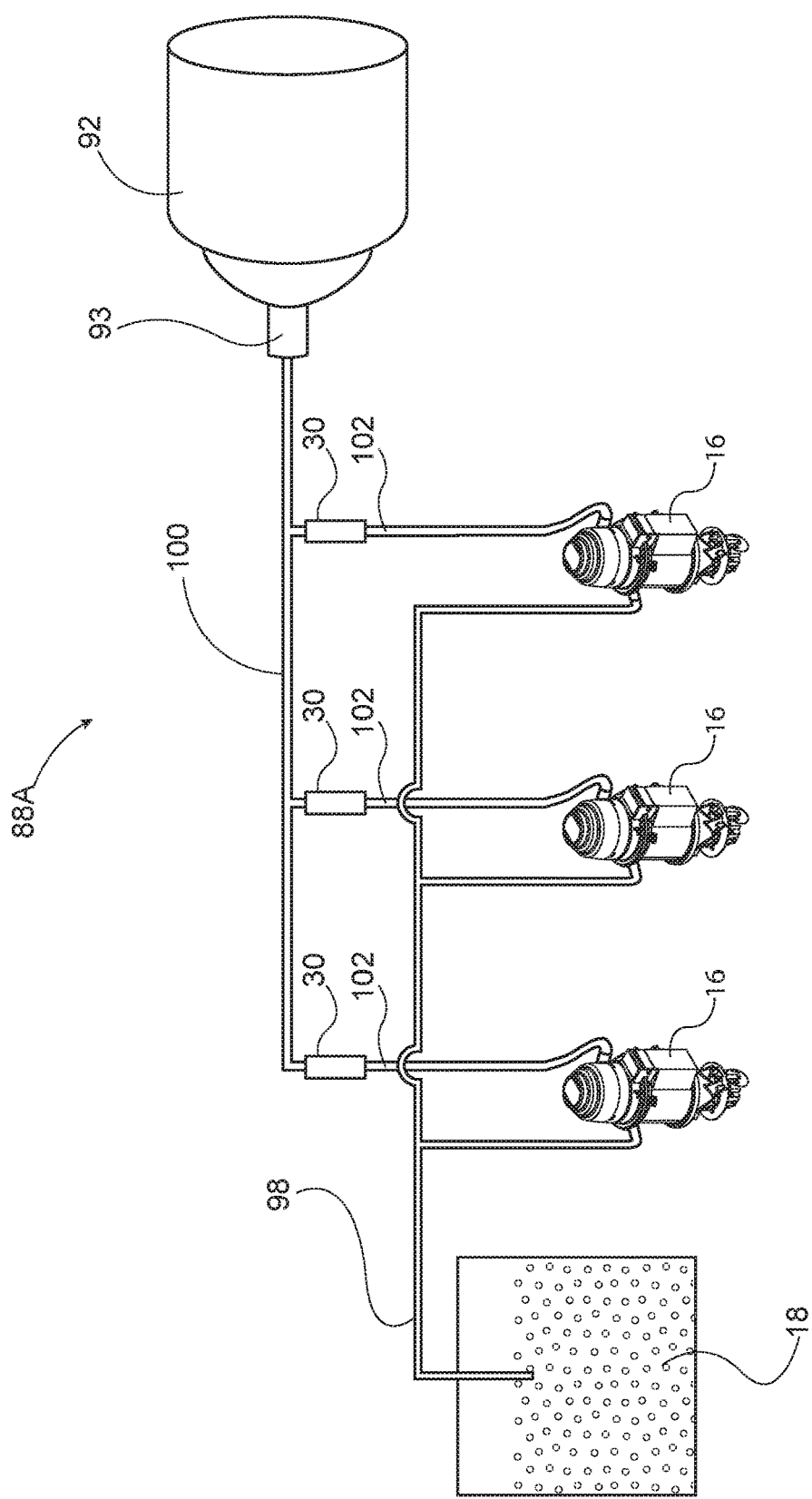
FIG. 2 is a schematic representation of a resin or other granular material delivery system with a plurality of air flow regulators in accordance with aspects of this invention.
Figure 3:
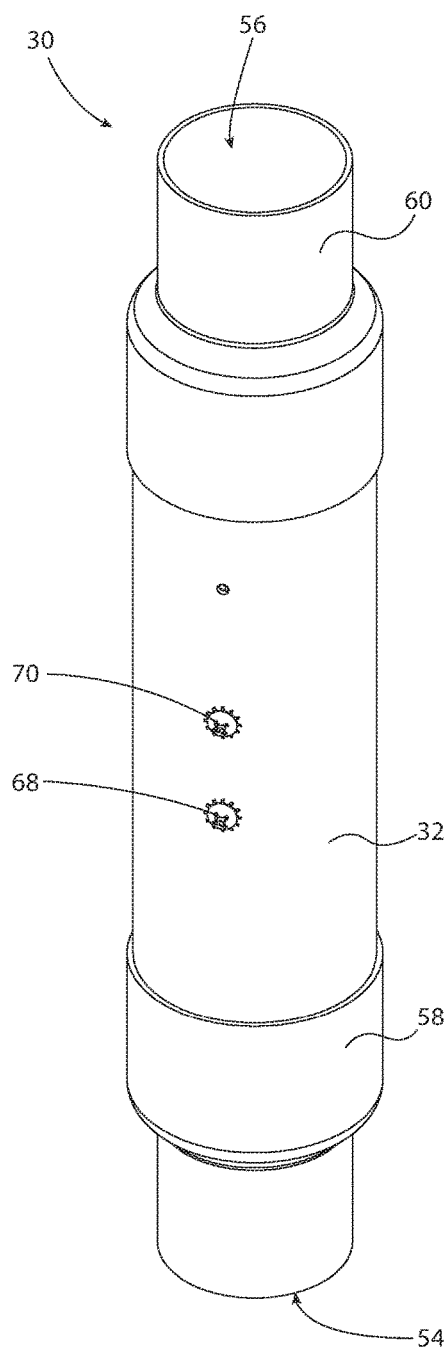
FIG. 3 is an isometric view of the exterior of an air flow limiter portion of apparatus for pneumatically conveying granular plastic resin or other material granules in accordance with aspects of the invention.
Figure 4:
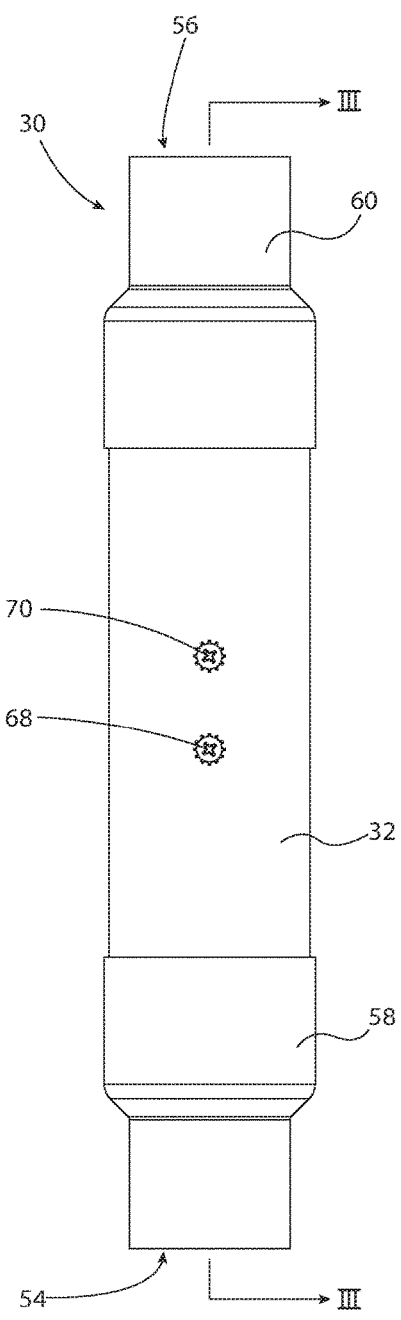
FIG. 4 is a front elevation of the air flow limiter illustrated in FIG. 3.

FIG. 2 shows an alternate embodiment of the granular material conveying system where this alternate embodiment of the conveying system has been designated 88A. FIG. 2, as in FIG. 1, depicts a vacuum pump 92 shown in schematic form having a vacuum pump suction head 93 also depicted in schematic form. In the alternate embodiment illustrated in FIG. 2, vacuum drawing conduit 100 leads directly into and communicates with vacuum pump suction head 93. In the embodiment illustrated in FIG. 2, an air flow limiter 30 is provided for each receiver 16, with the air flow limiter 30 for a respective receiver 16 being located in a portion of a connection conduit 102 that connects a respective receiver to vacuum drawing conduit 100. In FIG. 2, each air flow limiter 30 is depicted in a vertical orientation, just as airflow limiter 30 is depicted in a vertical orientation in FIG. 1. Each receiver is connected by connection conduit 102 to vacuum drawing conduit 100 with air flow limiter 30 preferably forming a portion of connection conduit 102.

In FIG. 2, as in FIG. 1, a first conduit 98 serves to convey granular plastic resin or other material granules from hopper 18 to the respective receivers in response to vacuum drawn by vacuum pump 92 as that vacuum propagates from vacuum pump 92 through second conduit 100, connection conduits 102, receivers 16, and granular material conveying conduit 98, to hopper 18.

During operation of the granular material conveying systems shown schematically in FIGS. 1 and 2, upon actuation of vacuum pump 92, a vacuum preferably is drawn at vacuum pump suction head 93. This vacuum, as it propagates back to hopper 18, serves to draw granular material out of hopper 18 and into the respective receivers 16. In the embodiment illustrated in FIG. 2, individual air flow limiters 30 limit the suction or vacuum drawn by vacuum pump 92 through a given associated receiver 16. In the embodiment illustrated in FIG. 1, a single air flow limiter 30 limits the vacuum drawn through all of receivers 16 forming a portion of the granular resin or other granular material conveying system illustrated in FIG. 1.

Referring to FIGS. 1 and 2, the air flow limiter 30 portion of the granular material delivery system is preferably in the general form of a substantially vertically oriented tube, preferably having inlet and outlet ends 54, 56 respectively. The preferably tubular character of air flow limiter 30 is apparent from FIGS. 3 through 8, where air flow limiter 30 preferably includes a vertically oriented exterior tube 32, with open-end caps 58, 60 defining and providing open inlet and outlet ends 54, 56 respectively. End caps 58, 60 are open, preferably of generally cylindrical configuration, and are configured to fit closely about vertically oriented tube 32 so as to provide a substantially air tight fit between end caps 54, 56 and tube 32.

As illustrated in FIG. 5, air flow limiter 30 preferably includes, within vertically oriented exterior tube 32, a horizontally positioned plate 46, which is oriented perpendicularly to the axis of tube 32. Plate 46 is preferably configured as a circular disk of lesser diameter than the inner diameter of vertically oriented tube 32, with plate 46 further preferably including three legs extending outwardly from the circular interior disk portion of plate 46. Legs of plate 46 are designated 62 in FIG. 9, while the circular interior portion of plate 46 is designated 64 in FIG. 9. Plate 46 is secured to the interior of vertically oriented outer tube 32 by attachment of legs 62 to the interior surface of tube 32. Any suitable means of attachment, such as by welding, adhesive, mechanical screws, or end portions of legs 62 defining tabs fitting into slots within tube 32 as shown in FIG. 5, may be used.

Figure 7:
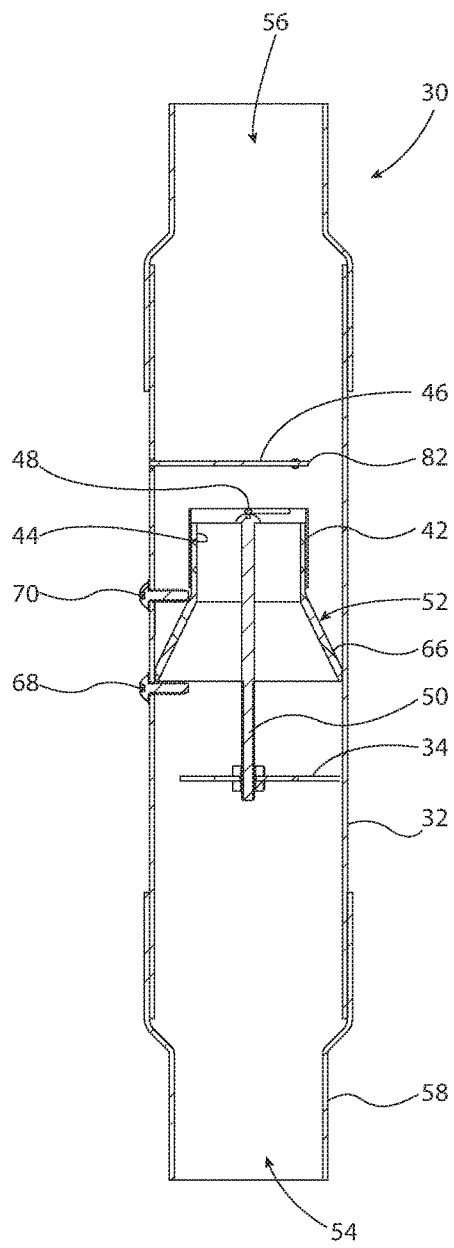
FIG. 7 is a sectional view in elevation similar to FIG. 6 but with the air flow limiter internal parts in position whereby there is no air entering the air flow limiter and hence there is no air flow upwardly through the air flow limiter, in contrast to such air flow being shown in FIG. 6.

As best shown in FIGS. 5, 6, and 7, a baffle 52 is positioned within vertically oriented outer tube 32, below plate 46. Baffle 52 has a lower conical portion 66 and an upper cylindrical portion 44, with cylindrical portion 44 defining a fixed internal tubular segment of air flow limiter 30. Baffle 52 is preferably retained in position by a pair of screws designated 68, 70 respectively. Baffle 52 preferably rests on screw 68. Screw 70 preferably fits against the fixed internal tubular segment 44 portion of baffle 52 to secure baffle 52 in position within vertically oriented external tube 32. Lateral force applied by screw 70 in a direction perpendicular to the axis of vertically oriented external tube 32, with screw 70 in contact with fixed internal tubular segment 44, serves to effectively retain baffle 52 against movement within vertically oriented external tube 32.

Figure 9:
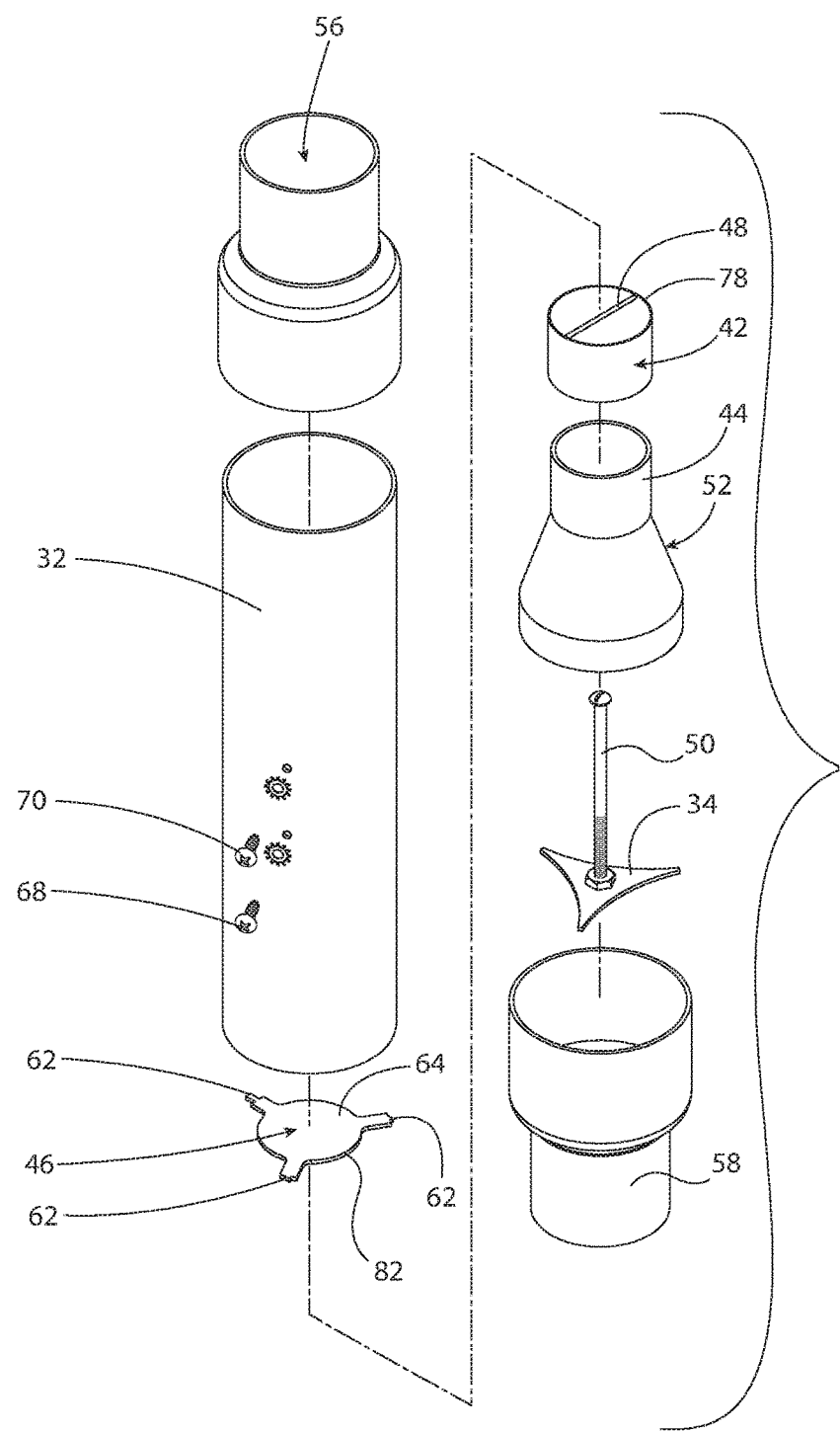
FIG. 9 is an exploded isometric view of the air flow limiter illustrated in FIGS. 3 through 8.
Figure 10:
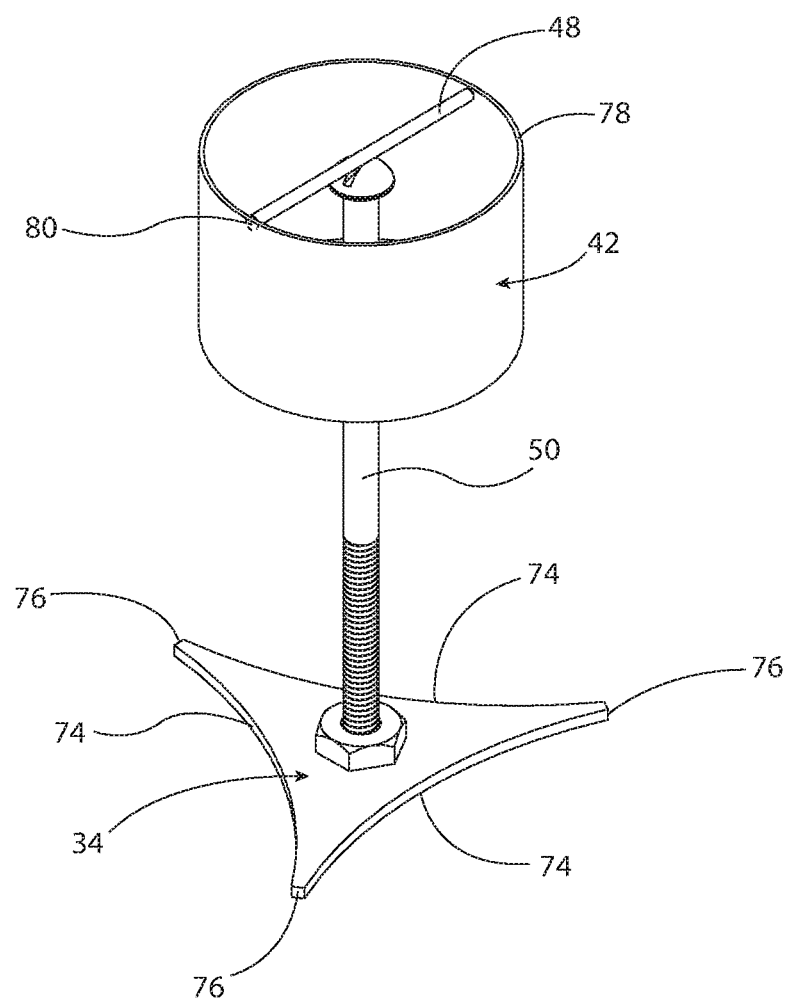
FIG. 10 is an isometric view of the movable portion of the air flow limiter illustrated in FIGS. 3 through 9.

The upper portion of baffle 52, defining fixed internal tubular segment 44, is adapted for sliding, preferably telescopic engagement with and movement therealong by movable tubular segment 42. Fixed to movable tubular segment 42 is a first strut 48 preferably extending transversally across the upper portion of movable tubular segment 42 and preferably secured at either end to movable tubular segment 42, as illustrated in FIG. 10. Preferably extending downwardly from first strut 48 is a second strut 50, preferably secured to first strut 48 and preferably also to a sail 34, as illustrated in FIG. 10 and in FIGS. 5, 6, 7, 8 and 9.

Movable sail 34 is preferably planar and positioned fixedly on second strut 50 to remain perpendicular with respect to the axis of vertically oriented outer tube 32. Movable sail 34 is preferably of generally triangular configuration, as best illustrated in FIGS. 9 and 10, with the sides of the triangle curving slightly inwardly. The curved edges 72 of movable sail 34 converge and terminate to form small rectangularly shaped extremities of sail 34, which are designated 76 in FIG. 9.

Movable sail 34 is positioned within generally vertically oriented outer tube 32 so that rectangular extremities 76 are closely adjacent to but do not contact the inner surface of preferably vertically oriented outer tube 32, so long as sail 34 moves vertically up and down within preferably vertically oriented external tube 32. The rectangular shape of extremities 76 with their outwardly facing preferably planar surface assures minimal friction and consequent minimal resistance to movement of movable sail 34 in the event one of rectangular extremities 76 contacts the interior surface of vertically oriented tube 32, should sail 34 for some reason move laterally, or otherwise, and become skew to the vertical axis of tube 32.

Movable internal tubular segment 42 is telescopically movable, unitarily with sail 34, relative to and along fixed internal tubular segment 44. A lower limit of movement of movable tubular segment 42 is illustrated in FIG. 7, where the first strut portion 48 of movable tubular segment 42 (shown in FIG. 10) rests on the upper circular edge of fixed internal tubular segment 44. This is the condition when no air is flowing or drawn through the air flow limiter 30 and gravity causes sail 34 together with movable internal tubular segment 42 to drop, with first strut 48 coming to rest on the upper circular edge of fixed tubular segment 44.

When air is flowing through air flow limiter 30, as illustrated generally in FIG. 6, the moving air pushes against movable sail 34, moving it upwardly. Movable internal tubular segment 42 moves upwardly unitarily with sail 34 due to the fixed connection of movable tubular segment 42 and movable sail 34 made via first and second struts 48, 50, as illustrated in FIGS. 5, 6, 7, 9, and 10.

If air flow upwardly through air flow limiter 30 reaches an extreme level, above an acceptable level of operation of the granular material delivery system of which air flow limiter 30 is a part, the excessive force (resulting from the high volume of air flow contacting sail 34) pushes sail 34 upwardly to the point that upper annular edge 78 of movable internal tubular segment 42 contacts plate 46. In this condition, which is illustrated in FIG. 8, no air can pass between the upper annular edge 78 of movable tubular segment 42 and flow limiting horizontal plate 46, and air flow stops.

Figure 8:
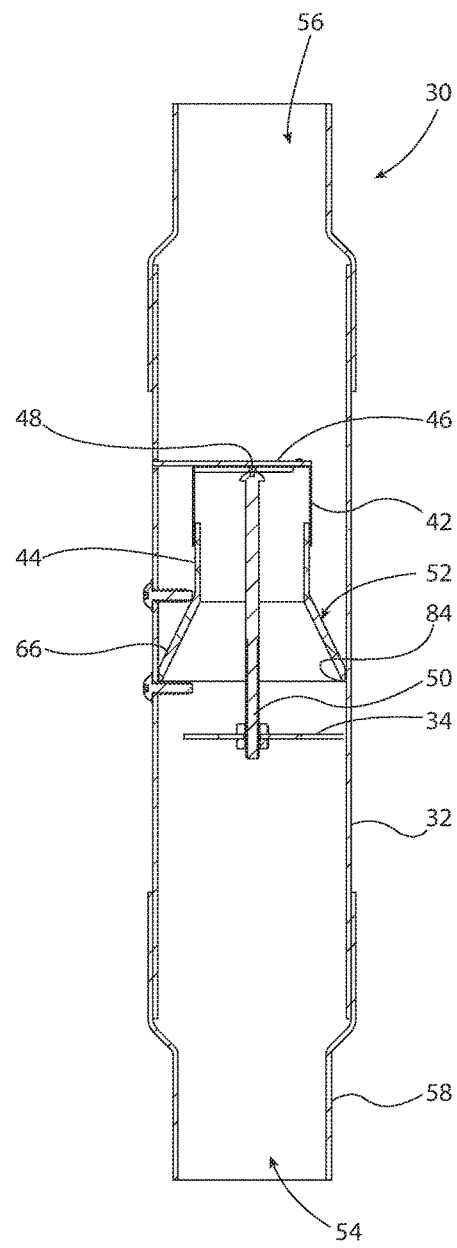
FIG. 8 is a sectional view in elevation similar to FIGS. 6 and 7 but with the air flow limiter internal parts in position where there is an excessive amount of air attempting to enter the air flow limiter but there is no air flow upwardly through the air flow limiter due to the air flow limiter valve having moved to block air flow upwardly through the air flow limiter, in contrast to upward air flow through the air flow limiter as shown in FIG. 4.

Once air flow stops through vertically oriented outer tube 32, gravity pulling downwardly on sail 34, connected movable internal tubular segment 42, and connected first and second struts 48, 50, causes these parts, which may preferably be fabricated together as a single integral assembly as shown in FIG. 8, to move downwardly, thereby again permitting air flow upwardly through air flow limiter 30 as depicted generally in FIG. 6. Consequently, air flow limiter 30 is self-regulating in that when air flow is too high, the force of air moving or impinging on sail 34 pushes movable internal tubular segment 42 upwardly until upper annular edge 78 of movable tubular segment 42 contacts plate 46 and no air can then escape upwardly between the upper annular edge 78 of movable tubular segment 42 and plate 46. This stops air flow through flow limiter 30 until downward movement of sail 34 together with movable internal tubular segment 42 moves upper annular edge 78 of movable tubular segment 42 away from plate 46, again permitting air to flow through the upper extremity of movable tubular segment 42, with air passing between upper annular edge 78 of movable internal tubular segment 42 and flow limiting horizontal plate 46, and then escaping through upper outlet end 56 of air flow limiter 30.

With the self-regulating characteristic of air flow limiter 30, the assembly consisting of movable internal tubular segment 42, first and second struts 48, 50 and sail 34 may oscillate somewhat about the position at which air flow drawn by suction is at the desired level, as the speed of the vacuum pump drawing air through flow limiter 30 varies, and hence the flow varies in cubic feet per minute of air drawn.

Desirably, ends of first strut 48, which is depicted as being horizontally disposed in the drawings, are mounted in movable tubular segment 42 in movable fashion such that first strut 48 can move slightly, rotationally, relative to movable internal segment 42. This is to provide a small amount of "play" in the event movable sail 34 and second strut 50, which is vertically oriented and connected to movable sail 34, become skew with respect to the vertical axis of vertically oriented exterior tube 32. Should this occur, the movable characteristic of first strut 48, being slightly rotatable relative to movable internal tubular segment 42, effectively precludes movable internal tubular segment 42 from binding with respect to fixed internal tubular segment 44 and thereby being restricted from what would otherwise be freely telescoping movement of movable internal tubular segment 42 relative to fixed internal tubular segment 44.

Desirably first strut 48 is rotatable relative to movable internal tubular segment 42, to provide maximum freedom of vertical motion of movable internal tubular segment 42 in the event movable sail 34 becomes skew to the axis of vertically oriented exterior tube 32, with consequent frictional force restricting vertical movement of movable sail 34.

Baffle 52 preferably includes two portions, the upper portion preferably being defined by fixed internal tubular segment 44 and a lower portion preferably being defined by conical portion 66 of baffle 52. A lower edge of baffle 52 is circular and is designated 84 in the drawings. Circular edge 84 fits closely against the annular interior wall of vertically oriented exterior tube 32 so that all air passing upwardly through air flow limiter 30, namely through preferably vertically oriented exterior tube 32, is constrained to flow through the interior of baffle 52. The tight fitting of the circular lower edge of baffle 52 against the interior wall of vertically oriented exterior tube 32 forces all air entering flow limiter 30 from the bottom to flow through the interior of baffle 52, flowing upwardly through lower conical portion 66 of baffle 52.

The air then flows further upwardly through the interior of fixed internal tubular segment 44. Thereafter, if movable internal tubular segment 42 is spaced away from flow limiting horizontal plate 46, air flows along the surface of movable internal tubular segment 42, passing the upper annular edge 78 of movable internal tubular segment 42; air then flows around the space between edge 82 of flow limiting horizontal plate 46 and the interior annular wall of vertically oriented exterior tube 32. The air then flows out of air flow limiter 30 via open outlet end 56 formed in end cap 60.

Figure 12:
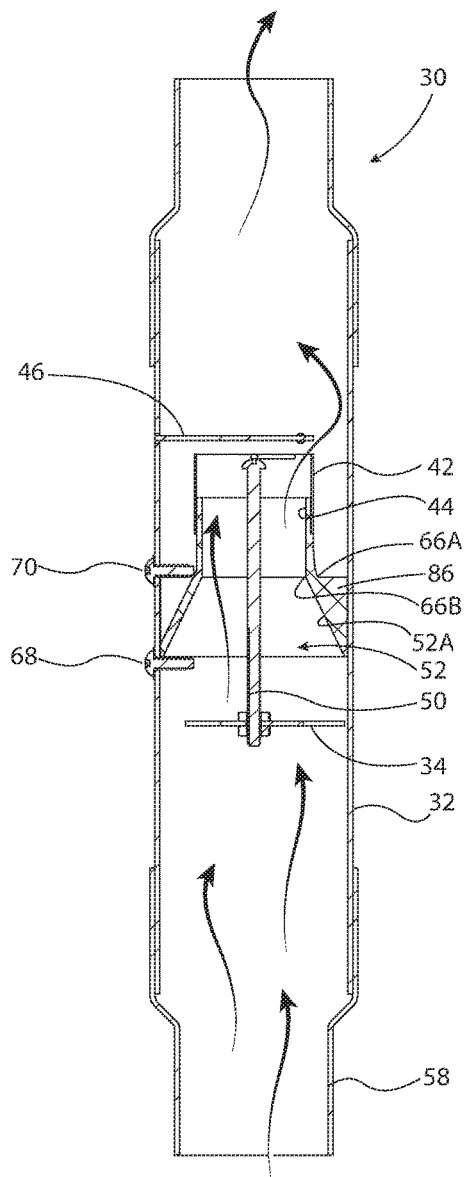
FIG. 12 is sectional view of the air flow limiter similar to FIGS. 6, 7, and 11, illustrating a second alternate construction of the baffle portion of the air flow limiter.

In an alternate embodiment of the air flow limiter, baffle 52 may be constructed from two pieces that fit closely together, with the two pieces being in facing contact in the area where they define fixed internal tubular segment 44, but diverging one from another in the area where they define conical portion 66 of baffle 52. As illustrated in FIG. 12, the two portions of baffle 52 are designated "66A" and "66B" where they diverge, with baffle portion 66A serving to channel air flow upwardly through vertically oriented exterior tube 32 into fixed internal tubular segment portion 44 of baffle 52. The space between the lower parts of baffle portions 66A and 66B is filled with a filler material 86 to provide additional assurance that all air entering vertically oriented exterior tube 32 from the bottom flows through fixed internal tubular segment 44 and on through movable internal tubular segment 42, and does not pass around the edge of baffle 52, namely between baffle 52 and the interior surface of vertically oriented exterior tube 32. Filler material 86 provides additional structural rigidity for flow limiter 30.

Figure 11:
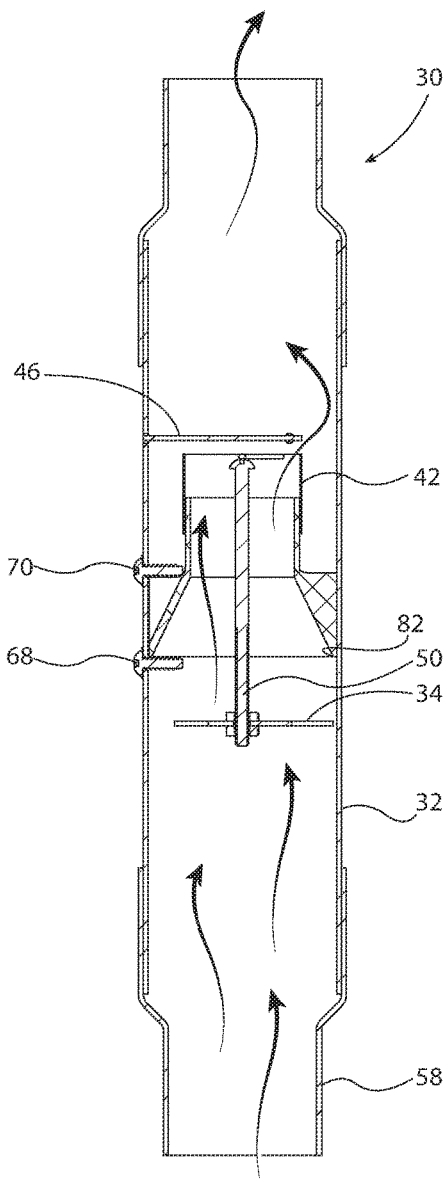
FIG. 11 is a sectional view of the air flow limiter similar to FIGS. 6, 7 and 8, illustrating an alternate construction of the baffle portion of the air flow limiter.

In another alternative environment of the air flow limiter, baffle 52 is one single piece, preferably molded plastic, as illustrated in FIG. 11, where baffle 52 is designated 52B to distinguish it from the baffle construction illustrated in FIG. 12 and the baffle construction illustrated in the other drawing figures. In the baffle construction illustrated in FIG. 11, the one piece construction means there is no need or space for any filler material. The baffle construction illustrated in FIGS. 3 through 10 is preferred.

The assembly illustrated in FIG. 10 comprising the moveable internal tubular segment 42, first strut 48, second strut 50 and moveable sail 34 may preferably be constructed as a single piece or several pieces as required. The assembly of moveable internal segment 42, first and second struts, 48, 50 and moveable sail 34 is referred to as a "sail assembly." It is not required that first and second struts 48, 50 be separate pieces; they may preferably be fabricated as a single piece. Additionally, second strut 50, which has been illustrated as a machine screw in FIGS. 9 and 10, need not be a machine screw. Any suitable structure can be used for second strut 50 and it is particularly desirable to fabricate first and second struts 48 and 50 from a single piece of plastic or metal, by molding, by machining, or by welding, or by otherwise fastening two pieces together. Similarly with the hex nut, which is unnumbered in FIG. 10 and illustrated there, any other suitable means for attachment of the second strut or a vertical portion of a strut assembly to moveable sail 34 may be used.

Air flow limiter 30 preferably contains no springs. Air flow limiter 30 preferably contains no sensors to provide feedback to a control device; no sensors are needed because flow limiter 30 is self-regulating. Air flow limiter 30 preferably includes a tubular valve, closing against a flat surface, where the tubular valve is defined by movable internal tubular segment 42 closing against flow limiting horizontal plate 46. Movable internal tubular segment 42 is in the form of an open-ended cylinder and is connected to a plate in the form of movable sail 34 to move movable tubular segment 42 against flow limiting horizontal plate 46. Air flow limiter 30 uses gravity alone to open the valve defined by the assembly of movable internal tubular segment 42, movable sail 34, and the connecting structure therebetween.

In the air flow limiter illustrated in FIGS. 3 through 12, the movable internal tubular segment 42 is preferably made with a very thin wall, preferably from metal tubing, where the wall is preferably less than 1/32 inch in thickness.

Air flow limiter 30 functions equally well with a vacuum pump drawing air through air flow limiter 30 from bottom to top by application of vacuum to outlet end 56 as depicted generally in FIGS. 1 and 2, or by air being supplied under positive pressure at inlet end 54 for passage upwardly through air flow limiter 30.

While the invention and the modes of operation have been described clearly and in more than sufficient detail that one of skill in the art may practice the invention using the teachings of the instant application, and while the claims appended hereto are clear and concise and find full support in the foregoing specification, the invention is not limited to the embodiments described in the foregoing specification or to the literal language of the appended claims. The invention further embraces components, assemblies and methods not disclosed herein but which would perform substantially the same function in substantially the same way to achieve the same result as the apparatus and methods that are the subject of the appended claims, all in accordance with the spirit of the invention.

In the claims appended hereto, the term "comprising" is to be understood as meaning "including, but not limited to" while the phrase "consisting of" is to be understood a meaning "having only and no more". The phrase "consisting essentially of" is to be understood to mean the specified, recited elements, materials or steps, as well as those that do not materially affect the basic and novel characteristics of the claimed invention. See In re Herz, 537 F.2d 549; 190 USPQ 461 (CCPA 1976); 2111 Manual of Patent Examining Procedure, Ninth Edition, Revision 07 2015, Last Revised November 2015.

The following is claimed:

1. A method for vacuum powered pneumatic conveying, without central control, granular resin plastic material from a supply to receivers, comprising:
    a) connecting self-contained, self-regulating air flow limiter for regulating flow rate between no flow and a preselected rate irrespective of pressure drop across the limiter, the limiter comprising a tube, a pair of open-ended tubular segments within the tube, a fixed outer tubular segment and a segment slideably axially movable along the fixed segment, a plate extending at least partially across the tube interior, positioned for contacting and limiting travel of the moveable tubular segment, the plate covering an outlet end of the movable tubular segment upon contact therewith, and a sail connected to the moveable segment, positioned in the tube upstream of the segments, the limiter maintaining flow to a preselected value, to a suction head of a vacuum pump, the flow limiter blocking flow when the preselected value is exceeded and blocking flow if vacuum draw ceases;
    c) connecting the receivers to the air flow limiter, each of the receivers being self contained without connection to or receipt of electrical signals;
    d) connecting a supply of granular plastic resin material to the receivers; and
    e) drawing vacuum from the supply via a conduit to the receivers and from the receivers via a second conduit to a vacuum pump suction intake, the vacuum drawing the granular plastic material from the supply to the receivers; and;
    f) blocking flow when either the preselected value is exceeded or vacuum draw ceases.

2. A method for vacuum pump powered pneumatic conveying granular plastic resin material without central control from a supply to receivers comprising:
    a) providing a vacuum drawing conduit connected to a suction head of a vacuum pump;
    b) providing self-contained, self regulating air flow limiter for regulating flow rate between no flow and a preselected rate irrespective of pressure drop across the limiter, the limiter comprising a tube, a pair of open-ended tubular segments within the tube, a fixed outer tubular segment and a segment slideably axially movable along the fixed segment, a plate extending at least partially across the tube interior, positioned for contacting and limiting travel of the moveable tubular segment, the plate covering an outlet end of the movable tubular segment upon contact therewith, and a sail connected to the moveable segment, positioned in the tube upstream of the segments, the limiter maintaining flow to a preselected value between each receiver and the vacuum drawing conduit;
    c) providing a conveying conduit between the supply and the receivers;
    d) drawing vacuum from the supply via a conduit to the receivers and from the receivers via a second conduit to a vacuum pump suction intake, the vacuum drawing the granular plastic material from the supply to the receivers; and;
    e) blocking flow from an individual receiver to the second conduit when either the preselected value is exceeded at the individual receiver or vacuum draw ceases.

* * * * *